United States Patent [19]

Hunt et al.

[11] Patent Number: 4,896,283

[45] Date of Patent: Jan. 23, 1990

[54] ITERATIVE REAL-TIME XY RASTER PATH GENERATOR FOR BOUNDED AREAS

[75] Inventors: Barry F. Hunt, Nashua, N.H.; Bruce Schurmann, Andover, Mass.

[73] Assignee: Hewlett-Packard Company, Palo Alto, Calif.

[21] Appl. No.: 837,487

[22] Filed: Mar. 7, 1986

[51] Int. Cl.[4] .......................... G06F 15/66; H04N 7/01
[52] U.S. Cl. .................................... 364/577; 358/140; 364/514
[58] Field of Search ............... 364/577, 514, 516, 518, 364/414, 415, 417, 169; 358/107, 112, 140; 73/606, 618, 624, 626, 625, 620; 128/660

[56] References Cited

U.S. PATENT DOCUMENTS

| 4,468,747 | 8/1984 | Leavitt et al. ........................ 364/577 |
| 4,471,449 | 9/1984 | Leavitt et al. ........................ 364/577 |
| 4,723,163 | 2/1988 | Skinner ................................ 358/140 |

Primary Examiner—Felix D. Gruber
Attorney, Agent, or Firm—Frank R. Perillo

[57] ABSTRACT

Apparatus for defining a step-by-step path through pixels located at the intersections of rectilinear coordinates that lie between boundaries that cross one set of coordinates. The respective distances of each of a pattern of pixels from one boundary and the distance between boundaries as well as the direction of the last step in the path are applied to a ROM to determine whether the next step is along one type of coordinate or the other or along a diagonal.

13 Claims, 4 Drawing Sheets

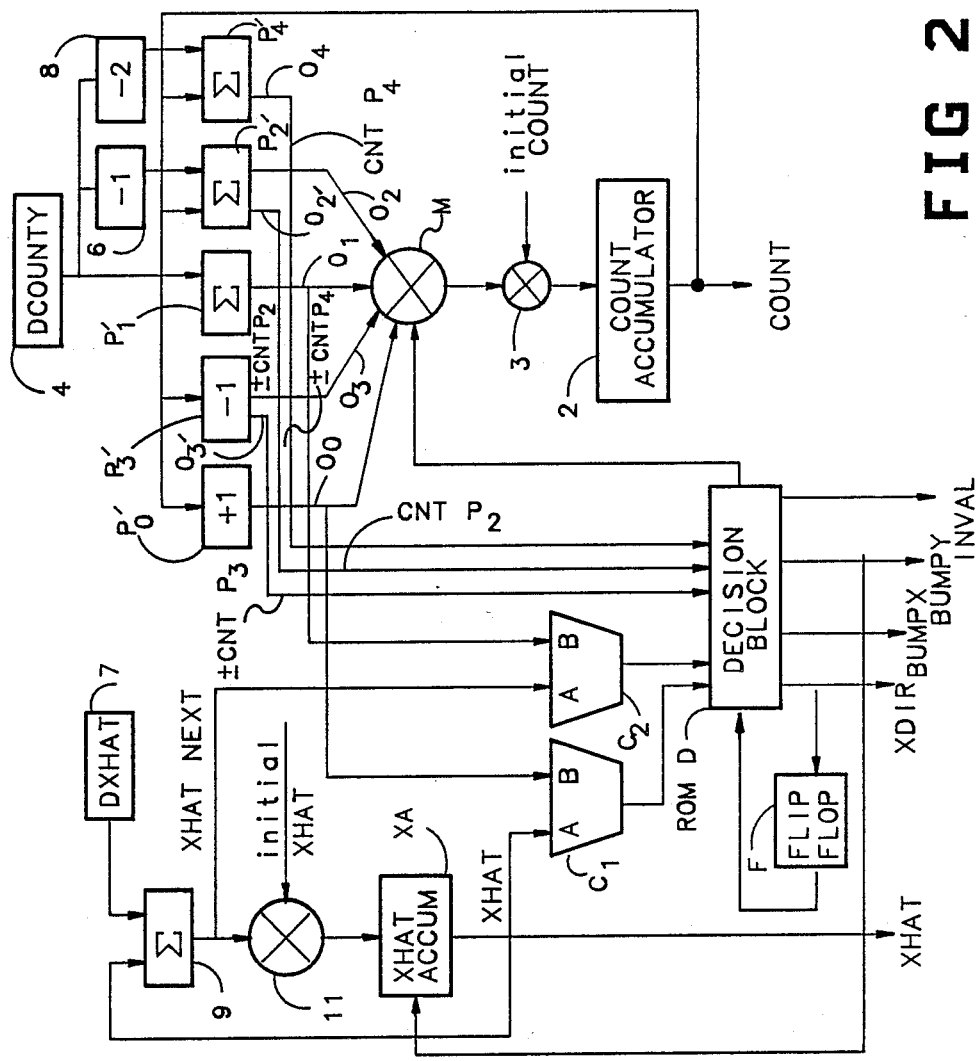
FIG 2
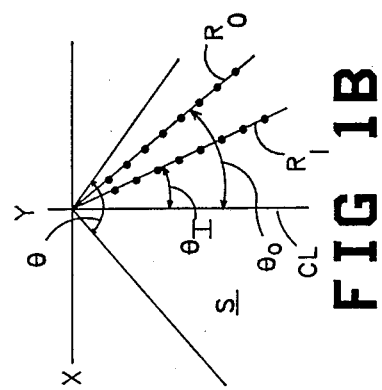
FIG 1A
FIG 1B

ITERATIVE REAL-TIME XY RASTER PATH GENERATOR FOR BOUNDED AREAS

BACKGROUND OF THE INVENTION

In U.S. Pat. No. 4,471,449 issued on Sept. 11, 1984 to Steven C. Leavitt et al, entitled "Scan Conversion System", and assigned to Hewlett-Packard Company, apparatus is described for deriving from analog signals produced along each of a plurality of radial lines in a sector data values that are to be displayed at pixels at rectilinear coordinates along parallel raster lines of a cathode ray tube. After two adjacent radial lines of raw data have been received and data is just beginning to be received along a third radial line, a state machine defines a step-by-step path through all of the pixels located in the slice between the radial lines. The steps are one pixel in length and go along the X or Y axis as required. By starting from a pixel location having a known radius and angular position with respect to the radial lines and iteratively adding certain values at each step, the radius and angular position of each pixel can be determined. The analog data along the radial lines is sampled and means utilizing the radial position of each pixel as it is attained selects four samples of raw data. A first intermediate interpolated data value is derived at the radius of the pixel from the two samples on one radial line, and a second interpolated data value is derived at the radius of the pixel from the two data samples on the other radial line. A final data value for display at each pixel is derived by interpolating the first and second interpolated data values. This process is carried out for every pixel in each slice in the sector.

Whereas it works very well, the path of pixels for each slice is different and is effectively stored in memory associated with the state machine. If it should be desired to expand a given portion of the sector, a feature normally referred to as "zoom", new paths through the pixels of each slice containing a portion of the selected area would have to be provided for each degree of magnification. A large amount of memory would be required for each degree of magnification, and it would not be practicable to provide continuous zoom from one magnification to the other.

BRIEF DESCRIPTION OF THE INVENTION

In accordance with this invention, the steps in the path through the pixels of a slice are calculated one at a time on a real-time basis by an iterative process. As each pixel in the path is reached, a determination is made as to whether each of a pattern of nearby test pixels is outside of the slice defined by the radial lines. From this determination and an indication of the direction in which the path approached the current pixel, the next step in the path is selected. In some cases, this next step will be to a pixel that is outside of the slice in order that a particular pixel be reached; but in such case, it is declared invalid. The pattern includes pixels in the same row as the current pixel in the path on either side thereof, a pixel in the same column as the current pixel, and a pixel in the same column as the pixel between the current pixel and the outer radial line, the latter two pixels being in a row adjacent the row in which the current pixel is located and on the side remote from the apex of the sector If the angle of the sector is greater than 45°, an additional pixel is provided in the adjacent row and one column closer to the outer radial lines. The same procedure can be used in defining a path through pixels in a slice defined by parallel lines.

BRIEF DESCRIPTION OF THE DRAWINGS

FIG. 1A illustrates parallel boundaries of pixels through which a path is to be determined;

FIG. 1B illustates radial boundaries of pixels through which a path is to be determined;

FIG. 1C illustrates a typical path through pixels between radial boundaries as well as certain parameters of the system;

FIG. 2 is a block diagram of a system incorporating the invention;

FIG. 3a sets forth the keys for interpreting FIGS. 3 and 4;

FIGS. 5, 6, 7 and 8 illustrate how the invented apparatus determines a step in the paths for respectively different situations.

DETAILED DESCRIPTION OF THE INVENTION

Figures 3, 4:
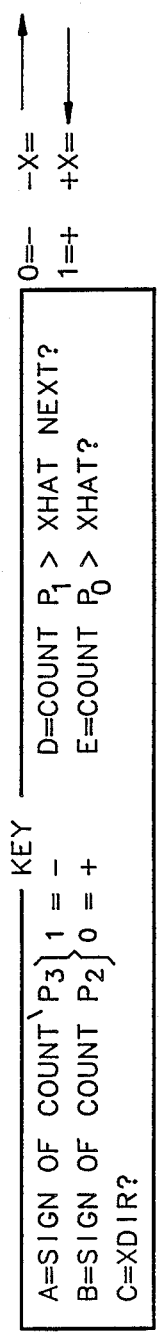
FIG. 3 is a Karnaugh map used in the invention when a test pixel $P_4$ is inside the outer boundary.
FIG. 4 is a Karnaugh map used in the invention when a test pixel $P_4$ is outside of the outer boundary.

FIG. 1A illustrates a slice through a field of pixels that lies between two parallel lines $L_I$ and $L_O$; and FIG. 1B illustrates a slice through a field of pixels that lies between an inner radial line $R_I$ that is closer to the center line CL of a sector S and an outer radial line $R_O$ that is farther away from the center line CL. Samples of raw data can be attained along the lines $L_I$ and $L_O$ or along the radial lines $R_I$ and $R_O$ as indicated by the dots. Although the invention will be described as defining a path through a slice between radial lines $R_I$ and $R_O$ of the sector S of FIG. 1B, it can easily be used to define a path through the pixels of a slice between parallel lines $L_I$ and $L_O$ of FIG. 1A.

FIG. 1C shows a portion of a slice between radial lines $R_I$ and $R_O$. In the upper portion, there is a path PT shown that passes through the pixels shown as dots that are at the intersections of equally spaced rows and columns. The path goes from a starting pixel $P_F$ through the other pixels in the direction of the arrows therein. By an arbitrary decision, pixels located on either of the radial lines $R_I$ or $R_O$ are considered to be within the slice. At each pixel in the path PT, the next pixel in the path is selected. Therefore, in the interest of saving time, it is desirable that the path PT not pass through pixels that are outside of the slice. This requires diagonal moves such as $d_1$ through $d_4$. In some situations that will be illustrated, however, the path will pass through pixels outside of the slice in order to avoid missing a pixel that is in the slice.

At this point, certain terms must be defined. Refer to the lower portion of FIG. 1C. XHAT is the distance between boundary lines of a slice such as $R_I$ and $R_O$ as measured along a row of pixels. As used herein, it means the distance measured along the row where the current pixel PC is located, e.g., row C. XHAT NEXT is the distance between the boundary lines $R_I$ and $R_O$ as measured along the next outward row of pixels, such as CN. In a situation such as FIG. 1A where the boundary lines $L_I$ and $L_O$ are parallel, XHAT will equal XHAT NEXT; but where the boundary lines are radial such as $R_I$ and $R_O$ of FIG. 1B, XHAT NEXT is greater than XHAT by $\Delta Y/\Delta X$ times $|\tan\theta_O - \tan\theta_I| = $ DXHAT.

In this particular embodiment of the invention, COUNT is the distance as measured along a row from the outer boundary line such as $R_O$ to the pixel of interest in FIG. 1C. The dimension of COUNT for the pixel $P_3$ is shown. Note that in this case it is slightly less than the distance $\Delta X=1$ between pixels because the next pixel to the right, $P_X$ has a COUNT that is negative.

The value of COUNT increases by what is called DCOUNTY for each step from one row of pixels to the next. When the step is along a diagonal such as $d_1$ through $d_4$, COUNT changes by DCOUNTY$-1$. This is illustrated by a step from P to P' in FIG. 1C. DCOUNTY is equal to $\Delta Y/\Delta X$ times $\tan \theta_O$, where $\theta_O$ is the angle of the outer radial line.

If the value of COUNT at the first pixel $P_F$ in the path is "0", the accumulated value of the changes in COUNT noted above will be positive if the pixel in question is inside of $R_O$ and negative if the pixel is outside of $R_O$, e.g., the value of COUNT for the pixel $P_X$ would be negative. Furthermore, by comparing the value of COUNT for a pixel with the value of XHAT for the row in which it resides, it can be determined whether a pixel is inside of the inner boundary $R_I$. An example of this would be the pixel $P_Y$.

Thus, if the sign of COUNT for a pixel is negative, the pixel is to the right of $R_O$; and if the positive value of COUNT for a pixel is greater than XHAT for the row in which it resides, the pixel is to the left of $R_I$. Otherwise, the pixel is on $R_O$ or $R_I$ or in the slice between them.

As a first step in determining what the next pixel is to be, the value of COUNT for a plurality of nearby test pixels is determined. In the particular embodiment of the invention herein described, the pattern of these nearby test pixels is shown in FIG. 1C. The pixel $P_C$ is the current pixel, i.e., it is the last pixel in the path that has been determined. The test pixels are $P_0$, which is the next pixel toward the center of the sector from $P_C$ and in the same row as $P_C$; $P_3$ which is the next pixel away from the center of the sector and in the same row as $P_C$; $P_1$ which is in the same column as $P_C$ and in the next row on the side away from the apex of the sector; $P_2$ which is in the latter row and in the same column as $P_3$; and $P_4$ which is in the latter row and adjacent $P_2$.

In the circuit shown in block diagram form in FIG. 2, the values and/or signs of COUNT as may be required are derived as follows. The value of COUNT for the initial pixel in the path is derived from a multiplexer 3 and provided by an accumulator 2 and applied to each of the circuits $P_0'$, $P_3'$, $P_1'$, $P_2'$ and $P_4'$. The value of DCOUNTY for the particular slice is provided from a register 4 directly to $P_1'$ via a subtractor 6 of $\Delta X=1$ to $P_2'$ and via a subtractor 8 of $2\Delta X$ to $P_4'$. The circuit $P_0'$ adds $\Delta X=1$ to the value of COUNT for $P_C$ so as to provide the value of COUNT for the test pixel $P_0$ at an output $O_0$. The circuit $P_3'$ subtracts $\Delta X=1$ from the value of COUNT for $P_C$ so as to provide the value of COUNT for $P_3$ at one output $O_3$, and it also provides the sign of that value of COUNT at an output $O_3'$. The summer $P_1'$ supplies the value of COUNT for the pixel $P_1$ at its output $O_1$. The summer $P_2'$ provides the value of COUNT for $P_2$ because of the subtraction of $\Delta X=1$ by the subtractor 6 at an output $O_2$, and the sign of that value of COUNT at a output $O_2'$. The summer $P_4'$, after internally deriving the value of COUNT for $P_4$ by virtue of the subtraction of $2\Delta X=2$ by the subtractor 8, provides the sign of that value of COUNT at its output $O_4'$. It does not need to provide the value of COUNT for $P_4$ because it is never going to be selected as a pixel for the path. The pixel $P_4$ is included in the pattern so as to provide for the situation where the angle of the outer radial line $R_O$ is greater than 45°. The values of COUNT at the outputs $O_0$, $O_3$, $O_1$ and $O_2$ are supplied to a multiplexer M that selects the one that is for the next one of the pixels $P_0$, $P_1$, $P_2$ and $P_3$ that is selected by a decision ROM D. This value of COUNT is supplied via the accumulator 2 to the circuits, $P_0', P_3', P_1', P_2'$, and $P_4'$, so as to develop the values of COUNT for the new positions of $P_0, P_3, P_1, P_2$, and the signs of COUNT for $P_3, P_2$ and also for $P_4$ when it is used.

The inputs to the decision ROM D include indications of the sign of COUNT for the pixels $P_3$, $P_2$ and $P_4$ via leads to the outputs $O_3'$, $O_2'$ and $O_4'$ respectively. An XHAT accumulator XA outputs in a manner to be described the value of XHAT for the row of pixels in which the current pixel $P_C$ resides. The output is applied to the A input of a comparator $C_1$ and the value of COUNT for the pixel $P_0$ that is at the output $O_0$ is supplied to the B input of $C_1$. If the value of COUNT for $P_0$ is greater than XHAT, $C_1$ outputs a "1" indicating that $P_0$ is inside $R_I$ and out of the slice; and if the value of COUNT for $P_0$ is less than or equal to XHAT, $C_1$ outputs a "0" indicating that $P_0$ is inside the slice formed by $R_I$ and $R_O$. The output of $C_1$ is applied to the decision ROM D.

The XHAT accumulator XA also supplies the value of XHAT NEXT to the A input of a comparator $C_2$ in a manner to be described, and the value of COUNT for the pixel $P_1$ that appears at the output $O_1$ is supplied to the B input of $C_2$. If the value of COUNT for $P_1$ is greater than XHAT NEXT, $C_1$ outputs a "1" indicating that $P_1$ is on the inside of $R_I$ and out of the slice; and if the value of COUNT for $P_1$ is less than or equal to XHAT NEXT, $C_1$ outputs a "0" indicating that $P_1$ is inside the slice formed by $R_I$ and $R_O$.

At the first pixel of the path, an assumption is made for the direction of the first step along the row of pixels in which the first pixel of the path resides. Also, the initial values of XHAT and COUNT are supplied to the respective accumulators. With this information, the decision ROM D outputs the direction XDIR of the first step in the path; an output on BUMPX if the next step in the path is to be to $P_0$ or $P_3$, depending on XDIR; an output on BUMPY if the next step in the path is to be to $P_1$; and an output on both BUMPX and BUMPY if the first step is a diagonal move to $P_2$. The ROM D also sends signals to the multiplexer M so as to select the value of COUNT for the pixel to which the first step is made. On the next clock pulse, the process is repeated but the current pixel $P_C$ is now the pixel to which the first step in the path is made. Whenever any pixel is outside the slice, the ROM D outputs a signal INVAL. This is used to prevent the provision of any invalid data to such a pixel.

In order that the ROM D may know the direction of the step taken to arrive at the current pixel $P_C$, the output XDIR is coupled back to an XDIR input via a flip-flop F.

The value of DXHAT is supplied from a source 7 to a summer 9 to which XHAT at the output of the XHAT accumulator XA is also supplied so as to provide the value of XHAT NEXT. At the start of a path, a multiplexer 11 supplies the value of COUNT for the first pixel in the path to the XHAT accumulator XA. Thus, for each step in Y from one row to the next, the output of XA is increased by DXHAT.

The XHAT accumulator XA is updated by the BUMPY signal from the decision ROM D whenever it selects a step to a pixel in the next row of pixels so as to place the former XHAT NEXT at its output as the new value of XHAT.

If the boundary lines of a slice are parallel, such as $L_I$ and $L_O$ of FIG. 1A, the value of DCOUNTY is "0". With this change, the same calculations can be used.

The outputs of the decision ROM D for any combination of inputs is set forth in FIGS. 3 and 4. They have to be determined by examining the relationship between the boundary lines $R_O$ and $R_I$ and the various test pixels that is indicated by each input of the Karnaugh maps of FIGS. 3 and 4. The operation of the ROM D is generally as follows.

If the sign of COUNT for $P_4$ is "+", as indicated by a "0" at the output $O_4'$, it means that the test pixel $P_4$ is inside $R_O$ so that the Karnaugh map of FIG. 3 is used; but if the sign of COUNT is "−", the Karnaugh map of FIG. 4 is used. Examination of these maps shows that they are identical except for the position 10:000 at the lower left corner. As previously stated, $P_4$ only needs to be used when the angle of the outer radial line $R_O$ is greater than 45°. Reference is made to FIG. 5 for an explanation of the need for $P_4$. If the outside boundary of a slice is a radial line $R_O$ at 45°, the path will be followed from $P_C$ to $P_2$ and then back toward $P_1$; but if knowledge of $P_4$ does not exist and the outermost line is at an angle of say 60°, the path would go from $P_C$ to $P_2$ and then left to $P_1$ so as to miss $P_4$ entirely. The problem with this is that it leaves a hole in the output image that might form an annoying artifact pattern. But if $P_4$ is examined, the path would go from $P_C$ to $P_3$ to $P_4$ and then go back to $P_2$.

If the current pixel $P_C$ is well within the slice, as shown in FIG. 6, and has been approached from the inner boundary as indicated, it is apparent that the next step is to the position occupied by $P_3$. To see that this occurs, note that the following inputs would be made to the decision ROM D. Because the value of COUNT for $P_4$ is "+", we use the map of FIG. 3. The inputs are:
A = + = 0,
B = + = 0:
C = 0,
D = 0, and
E = 0.
This is box 00:000 which indicates that the next step is a move to the right from the present position of $P_C$, i.e., to the present position of $P_3$.

After this first move, however, as shown in FIG. 7, the sign of COUNT for $P_4$ is "−", i.e., a "1", so that we use the Karnaugh map of FIG. 4. The inputs for this situation are:
A = + = 1,
B = + = 0:
C = 0,
D = 0, and
E = 0.
This is the box 10:000 which means that the path goes from $P_C$ to $P_2$ as indicated.

FIG. 8 illustrates the start of a path at the apex of the sector along a slice that is directed generally down and to the right. At the apex XHAT = 0, COUNT = 0 and XHAT NEXT is slightly greater than 0. The sign of COUNT for $P_4$ is "−" so that we use the map of FIG. 4. The other inputs are
A = 1,
B = 0:
C = 0,
D = 1, and
E = 1.
It is assumed that XDIR is to the right. From this, it can be seen that the box 10:011 is indicated so that the first step is diagonal to $P_2$ and is valid.

The principle advantage of having $P_2$ is to provide for pixels along a 45° line. Therefore, the most significant test pixels are $P_0$, $P_3$ and $P_2$. When moving to the right from a point well within a slice, $P_3$ indicates when it is time to make a movement in Y; but the information of $P_0$ does not mean anything. The reverse is true when moving to the left. The test pixel $P_1$ is for the situation encountered when the slice is at a shallow angle with horizontal and thus at the point of interest, in which event the value of COUNT for $P_1$ will be greater than XHAT NEXT so that the appropriate step can be taken as indicated in FIG. 5.

For the third quadrant, everything would be a mirror image. It would be possible to measure the value of COUNT from the inside boundary $R_I$ but this would require different Karnaugh maps.

What is claimed is:

1. Apparatus for calculating the next pixel in a path through pixels located at intersections of first and second sets of coordinates that lie between first and second boundaries.

means responsive to a first signal representing the distance of an initial pixel in the path from said first boundary as measured along the coordinate of said first set on which said initial pixel is located for providing second signals respectively representing the distances of given test pixels of a pattern of test pixels from said first boundary as measured from said first boundary along coordinates of said first set on which they are located, said test pixels of said pattern having given coordinate positions with respect to said initial pixel, means for providing a third signal indicating the direction of said path along said coordinate at said initial pixel, means responsive to said second signals for respectively providing first indications as to the side of said first boundary at least some of said given test pixels are on, means responsive to a fourth signal representing the distance between said boundaries as measured along one of said first set of coordinates on which a test pixel is located for providing fifth signals respectively representing the distances between said first and second boundaries as measured along other coordinates of said first set on which other test pixels of said pattern are located, means responsive to said second and fifth signals for respectively providing second indications as to the side of said second boundary other test pixels of said pattern are on, and path selection means responsive to said first and second indications and to said third signal for providing signals for indicating steps along said coordinates required to reach the test pixel of said pattern that is the next pixel in the path and a sixth signal indicating the direction of approach of the path to said next pixel along the coordinate of said first set on which said next pixel is located.

2. Apparatus as set forth in claim 1 wherein said means for providing said third signal is coupled to receive said sixth signal from said path selection means and substitute it for said third signal, and means for substituting for said first signal the one of said second signals that corresponds to the test pixel that is indicated as being the next pixel in the path by said path selection means.

3. Apparatus as set forth in claim 1 wherein said pattern of test pixels includes first and second test pixels on opposite sides of said initial pixel and on the same one of said first set of coordinates as said initial pixel as well as a third test pixel on another coordinate of said first set and on the same coordinate of said second set of coordinates as said initial pixel.

4. Apparatus as set forth in claim 3 wherein said pattern of test pixels also includes a fourth test pixel that is on said another coordinate and the same coordinate of said second set as one of said first and second test pixels.

5. Apparatus as set forth in claim 4 wherein said pattern of test pixels also includes a fifth test pixel that is on said another coordinate and on a coordinate of said second set that is on the opposite side of the coordinate on which said fourth test pixel is located from the coordinate of said second set on which said current initial pixel is located.

6. Apparatus as set forth in claim 1 wherein said means for providing said second signals includes:

means for adding the distance between coordinates of said second set to said first signal, means for subtracting the distance between coordinates of said second set from said first signal, a source of a seventh signal representing the difference between the distances from said first boundary of intersections of a coordinate of said second set with parallel coordinates of said first set, and means for adding said seventh signal to said first signal.

7. Apparatus as set forth in claim 6 further comprising:

means for adding said seventh signal and subtracting twice the distance between coordinates of said second set from said first signal.

8. Apparatus as set forth in claim 1 wherein said other test pixels include a first test pixel on the same one of said first set of coordinates as said initial pixel and nearer said second boundary and a second test pixel at the intersection of a coordinate parallel to the coordinate of said first set on which the initial pixel is located and a coordinate of the second set on which the initial pixel is located, and wherein said means for providing said second indications comprises:

a first comparator having two inputs and an output, one of said inputs being coupled to receive said fourth signal and the other of said inputs being coupled to receive the one of said second signals that is for said first test pixel so as to provide one of said second indications at its output, a source of a signal representing the difference of the distances between said boundaries as measured along adjacent coordinates of said first set, means for providing the sum of said fourth signal and the signal provided by said source, and a second comparator having two inputs and an output, one of said latter inputs being coupled to receive the sum provided by said latter means and the other of said latter inputs being coupled to receive the one of said second signals that is for said second test pixel so as to provide another one of said second indications at its output.

9. Apparatus as set forth in claim 1 wherein said given test pixels include a first test pixel on the same one of said first coordinates as said initial pixel and nearer said first boundary, a second test pixel at the intersection of the one of said second coordinates on which said first test pixel is located and a coordinate of said first set that is adjacent the coordinate of said first set on which said first test pixel is located, and wherein said means for providing said first indications comprises:

means for designating the signs of said second signal for said first test pixel, and means for designating the sign of said second signal for said second test pixel.

10. Apparatus as set forth in claim 1 wherein said given test pixels include a first test pixel on the same one of said first coordinates as said initial pixel and nearer said first boundary, a second test pixel at the intersection of the one of said second coordinates on which said first test pixel is located and a coordinate of said first set that is adjacent the coordinate of said first set on which said first test pixel is located, a third test pixel at the intersection of said adjacent coordinate of said first set and a coordinate of said second set that is nearer said first boundary than the coordinate of said second set on which said first and second test pixels are located, and wherein said means for providing said first indications comprises:

means for designating the sign of the second signal for said first test pixel, means for designating the sign of the second signal for said second test pixel, and means for designating the sign of the second signal for said third test pixel.

11. Apparatus as set forth in claim 1 wherein said path selection means is a ROM.

12. Apparatus for calculating the next pixel in a path from a current pixel that extends through pixels located at intersections of first and second sets of rectilinear coordinates that lie between first and second boundaries comprising:

means for providing first signals respectively representing the distances from a first boundary, as measured along coordinates of one set of coordinates of given test pixels of a pattern of test pixels that have predetermined coordinate positions with respect to a current pixel in the path, each of said signals having an indication of one sign when its pixel is on one side of said first boundary and indication of the opposite sign when its pixel is on the opposite side of said first boundary, means for respectively providing second signals representing the distances between said boundaries as measured along coordinates of said one set on which any test pixel is located, means for comparing the one of said first signals for each of other given test pixels of said pattern with the one of said second signals for that test pixel so as to derive one indication when that pixel is on one side of said second boundary and another indication when that pixel is on the other side of said second boundary, means for providing an indication as to the direction of approach of the path to said current pixel along the coordinate of said first set on which it is located, and means responsive to said indications for providing signals indicating the test pixel of said pattern that is to be the next pixel in the path and the direction of approach of the path to said latter test pixel along the coordinate of said first set in which it is located.

13. Apparatus for calculating the next pixel in a path from a current pixel that extends through pixels located at intersections of first and second sets of rectilinear coordinates that lie between first and second boundaries comprising:

means for providing indications as to which side of said first boundary given test pixels of a pattern of test pixels having predetermined coordinate positions with respect to a current pixel lie, means for providing indications as to which side of said second boundary along a coordinate of said first set other test pixels of said pattern lie, means for providing an indication as to the direction of the path at said current pixel, and means responsive to said indications for indicating the test pixel of said pattern that is to be the next pixel in the path.

* * * * *